(12) United States Patent
Graubmann

(10) Patent No.: US 11,833,880 B2
(45) Date of Patent: Dec. 5, 2023

(54) THERMAL MANAGEMENT SYSTEM AND AN ELECTRIC VEHICLE INCLUDING THE THERMAL MANAGEMENT SYSTEM

(71) Applicant: Ymer Technology AB, Stockholm (SE)

(72) Inventor: Josef Graubmann, Greifenberg am Ammersee (DE)

(73) Assignee: YMER TECHNOLOGY AB

( * ) Notice: Subject to any disclaimer, the term of this patent is extended or adjusted under 35 U.S.C. 154(b) by 0 days.

(21) Appl. No.: 17/999,248

(22) PCT Filed: Aug. 25, 2021

(86) PCT No.: PCT/EP2021/073471
§ 371 (c)(1),
(2) Date: Nov. 18, 2022

(87) PCT Pub. No.: WO2022/078661
PCT Pub. Date: Apr. 21, 2022

(65) Prior Publication Data
US 2023/0191869 A1    Jun. 22, 2023

(30) Foreign Application Priority Data
Oct. 15, 2020    (EP) .................................. 20202113

(51) Int. Cl.
*B60H 1/00*    (2006.01)
*B60H 1/14*    (2006.01)
*B60H 1/22*    (2006.01)

(52) U.S. Cl.
CPC ..... *B60H 1/00392* (2013.01); *B60H 1/00278* (2013.01); *B60H 1/00342* (2013.01);
(Continued)

(58) Field of Classification Search
CPC ............ B60H 1/00392; B60H 1/00885; B60H 1/2721; B60H 2001/00307
(Continued)

(56) References Cited

U.S. PATENT DOCUMENTS

| 2016/0107501 A1 | 4/2016 | Johnston et al. |
| 2018/0037086 A1 | 2/2018 | Nicgorski et al. |

(Continued)

FOREIGN PATENT DOCUMENTS

| CN | 106585411 A * | 4/2017 |
| GB | WO2012077062 A1 * | 6/2012 |

OTHER PUBLICATIONS

Written Opinion of International Search Report in International Application No. PCT/EP2021/073471 dated Dec. 14, 2021.
(Continued)

*Primary Examiner* — Davis D Hwu
(74) *Attorney, Agent, or Firm* — Kim IP Law Group LLC

(57) ABSTRACT

A thermal management system for controlling the temperature in a cabin and an energy storage system of an electric vehicle including a vehicle component is provided. The system provides for a heat exchanger arranged to heat the energy storage system, a heater for heating the cabin and the heat exchanger, a first valve arranged to receive a fluid that has been used for cooling the vehicle component, and to provide fluid to the heater, a temperature sensor arranged to measure the temperature of the fluid entering the first valve, a second valve receiving the fluid from the heater and having a first outlet in fluid communication with the cabin, and a second outlet in fluid communication with the heat exchanger, and a control unit.

15 Claims, 8 Drawing Sheets

(52) U.S. Cl.
CPC ......... *B60H 1/00885* (2013.01); *B60H 1/143* (2013.01); *B60H 1/2221* (2013.01); *B60H 2001/00307* (2013.01)

(58) Field of Classification Search
USPC ........................................................ 165/202
See application file for complete search history.

(56) References Cited

U.S. PATENT DOCUMENTS

| | | |
|---|---|---|
| 2018/0117984 A1 | 5/2018 | Kim et al. |
| 2018/0281557 A1 | 10/2018 | Park et al. |

OTHER PUBLICATIONS

International Search Report in International Application No. PCT/EP2021/073471 dated Dec. 14, 2021.
Extended European Search Report in related European Application No. 20202113 dated Apr. 8, 2021.

\* cited by examiner

THERMAL MANAGEMENT SYSTEM AND AN ELECTRIC VEHICLE INCLUDING THE THERMAL MANAGEMENT SYSTEM

CROSS-REFERENCE TO RELATED APPLICATIONS

This application is a U.S. national phase application under 35 U.S.C. § 371 of International Application No. PCT/EP2021/073471 filed on Aug. 25, 2021, which claims priority to European Patent Application No. 20202113.5, filed on Oct. 15, 2020, the entire disclosures of which are hereby incorporated by reference in their entirety for all purposes.

TECHNICAL FIELD

The present invention relates to a thermal management system for controlling the temperature in a cabin and an energy storage system of an electric vehicle including a vehicle component. The present disclosure also relates to an electric vehicle comprising the thermal management system.

BACKGROUND

Electric vehicles are becoming more and more popular. On the one hand they are preferable for environmental reasons, by avoiding fossil fuels, and on the other hand they are, most of the cases, preferred in regard to reduced total cost of ownership.

Cars are not the only type of vehicles that can be an electric vehicle. For example, boats, trucks, locomotives, airplanes and heavy-duty vehicles are also available as electrical vehicles.

Electric vehicles are usually powered by an energy storage system during operation. The energy storage system here being defined as any kind of battery, battery pack or series of batteries for powering the electric vehicle.

For the usability of electric vehicles, it is important that the energy storage system has a long lifetime, i.e. a large number of charge/discharge cycles possible before the cells fail to operate satisfactorily. Keeping the energy storage system in an optimal temperature range is essential to maximize the lifetime.

Besides improving the energy storage system lifetime, keeping the energy storage system within the optimal temperature range during operation ensures that the energy storage system delivers as much power as possible.

As well as keeping the energy storage system at an optimal temperature, the temperature in the cabin, where the operator and passengers of the vehicle are housed, should also be regulated.

There are many systems for managing temperatures in the energy storage system and the cabin. For example, in U.S. Pat. No. 7,789,176B2, a thermal management system is presented, which has a cooling loop for cooling the drive motor, a refrigeration subsystem which provides cooling to a heat exchanger, an energy storage cooling subsystem with a coolant cooled via heat transfer in the heat exchanger, and a HVAC subsystem that provides temperature control for the vehicle's passenger cabin. The HVAC subsystem is also coupled to the heat exchanger for its coolant to be cooled by the refrigeration subsystem and to the cooling loop for cooling the drive motor for its coolant to be heated by the cooling loop. In this solution, heat in the cooling loop for the drive motor can be used for heating the cabin and cold from the refrigeration subsystem can be used to cool both the energy storage system and the cabin. The energy storage cooling subsystem also has a heater if the energy storage system needs heating.

Another important aspect of thermal management in an electric vehicle is that it takes up space in the vehicle as well as increases the weight. A space efficient and weight optimized thermal management system is therefore preferable.

US 2016/0107501A1 discloses a vehicle thermal management system comprising a passenger cabin thermal control loop that circulates a heat transfer fluid and provides temperature control of a vehicle passenger cabin, a battery thermal control loop that circulates a heat transfer fluid and is thermally coupled to a vehicle battery pack, and a drive train control loop that circulates a heat transfer fluid and is thermally coupled to a drive train component. The passenger cabin thermal control loop comprises a heater and a heat exchanger for heating the cabin. The thermal management system further comprises a first valve assembly, wherein the passenger cabin thermal control loop operates in parallel with and independent of the battery thermal control loop when the first valve assembly is configured in a first valve assembly first mode, and wherein the passenger cabin thermal control loop is serially coupled to the battery thermal control loop when the first valve assembly is configured in a first valve assembly second mode; and a second valve assembly, wherein the battery thermal control loop operates in parallel with and independent of the drive train thermal control loop when the second valve assembly is configured in a second valve assembly first mode, and the battery thermal control loop is serially coupled to the drive train thermal control loop when the second valve assembly is configured in a second valve assembly second mode. When the passenger cabin thermal control loop and the battery thermal control loop are serially coupled the heater heats both the cabin and the battery, and when the passenger cabin thermal control loop and the battery thermal control loop are coupled in parallel, the heater heats only the cabin.

In an electric vehicle, the power for heating and cooling comes from the energy storage system. Therefore, it is essential that the thermal management is as energy efficient as possible so that more of the power of the energy storage system can be used for operating the electric vehicle.

SUMMARY

It is an aim of the present invention to provide an improved thermal management system for controlling the temperature in a cabin and an energy storage system of an electric vehicle including a vehicle component and a cooling loop including a thermal fluid for cooling the vehicle component.

This aim is achieved by a thermal management system as defined in claim 1.

The thermal management system comprises:
one heat exchanger arranged to heat the energy storage system,
one heater arranged to heat the cabin and to provide heat to the heat exchanger,
a first valve disposed in the cooling loop and having an inlet arranged to receive the thermal fluid that has been used for cooling the vehicle component, and an openable and closable outlet in fluid communication with the heater,
a first temperature sensor arranged to measure the temperature of the thermal fluid entering the inlet of the first valve, wherein the first temperature sensor is arranged in the first valve or in a passage before the thermal fluid enters the first valve, and a second valve having an inlet arranged to receive the thermal fluid from the heater, a first outlet in fluid communication with the cabin, and a second outlet in fluid communication with the heat exchanger, and a control unit configured to:
receive data associated with a measured temperature in the cabin,
receive data associated with a measured temperature in the energy storage system,
determine if any of the cabin or the energy storage system needs to be heated, based on the received data,
receive the measured temperature of the thermal fluid from the first temperature sensor,
determine if there is excess heat in the thermal fluid entering the inlet of the first valve based on the measured temperature from the first temperature sensor,
control the opening and closing of the outlet of the first valve so that the thermal fluid is provided to the heater when there is excess heat in the thermal fluid and any of the energy storage system and the cabin needs to be heated, and
control the second valve so that the thermal fluid from the heater is distributed to the cabin and/or to the heat exchanger based on the need of heating of the cabin and the energy storage system.

The present invention reduces the energy needed from the energy storage for heating the cabin and the energy storage. This is achieved by using the same heater for heating the cabin and the energy storage system, to supply thermal fluid from the loop for cooling the vehicle component to the heater when there is excess heat in the thermal fluid in the cooling loop and any of the energy storage system and the cabin needs to be heated, and to distribute the thermal fluid from the heater to the cabin and/or to the heat exchanger in dependence on the need of heating of the cabin and the energy storage.

The system comprises one heat exchanger arranged to heat the energy storage system, one heater arranged to heat the cabin when the cabin temperature is colder than a user selected temperature and to provide heat to the heat exchanger when the energy storage system is colder than a minimum temperature, a first valve arranged to receive thermal fluid that has been used for cooling the vehicle component, a first temperature sensor arranged to measure the temperature of the received thermal fluid, and a control unit. The first valve has an openable and closable outlet in fluid communication with the heater.

The vehicle component can be any component of the electric vehicle that requires cooling with a thermal fluid. For example, the vehicle component can be one or more parts of a power train, any kind of e-motor, inverter, or DC/DC converter.

With the term "to determine if there is excess heat in the thermal fluid" is meant to determine if the heat energy in the thermal fluid is enough to contribute to the heating of the cabin and/or the energy storage system. For example, this can be done by determining if the thermal fluid is warm enough to contribute to the heating of the cabin and/or the energy storage system. Alternatively, the available heat power can be calculated based on the temperature of the thermal fluid and the pump speed.

The second valve can be a three-way valve, or a corresponding valve or valve assembly having the same functionality.

If there is excessive heat in the cooling loop, the thermal fluid is passed on to the heater, via the first outlet of the first valve. Thus, the heater needs to heat the thermal fluid less, or not at all, to achieve the same temperature than without the heat from the thermal fluid from cooling the vehicle component. If the thermal fluid has enough heat energy, the heater does not need to heat the thermal fluid at all. Accordingly, the power needed from the energy storage system for heating the cabin and the energy storage system is reduced or even zero.

The temperature of the thermal fluid at the inlet of the first valve gives an indication of whether there is excess heat in the thermal fluid that has been used to cool the vehicle component. The thermal management system is arranged so that excess heat from cooling the vehicle component can be used to heat the cabin as well as the energy storage system. For the cabin, the heat is provided to a cooling and heating unit, e.g., a heating, ventilation, and air conditioning, HVAC unit, arranged in the cabin.

Using the data from the temperature sensor and input data associated with a measured temperature in the cabin and the energy storage system, the control unit can control the first valve so that excess heat from the vehicle component can be used in the cabin, the energy storage system, or in both. Thus, the use of energy from the energy storage system for heating the cabin and the energy storage system is reduced. Accordingly, the energy in the energy storage system will last longer, and the energy storage system needs to be charged less frequently.

The same heater is used to heat both the cabin and the energy storage system. By minimizing the number of heaters, the weight of the system is minimized. Furthermore, during operation of the electric vehicle, it is the energy storage system that powers any heater. Therefore, it is also an advantage that only one heater is used for all heating in the thermal management system. Cost is also reduced by having only one heater.

Preferably, the thermal fluid from the first valve is directly passed to the heater, without passing any other thermal control loops or components, such as heat exchanges, that may cause cooling of the thermal fluid and accordingly reduce the energy saving.

The heater is, for example, arranged to heat the cabin when the cabin temperature is colder than a user selected temperature and to provide heat to the heat exchanger when the energy storage system is colder than a minimum temperature.

The control unit can select to pass all the thermal fluid from the heater to the cabin, or to pass all the thermal fluid from the heater to the heat exchanger for heating the energy storage system, or to pass a part of the thermal fluid to the cabin and the other part to the heat exchanger.

According to some aspects, the control unit is arranged to control the second valve so that the thermal fluid from the heater is provided to the cabin, or to the energy storage system, or to both the cabin and the energy storage system based on whether the cabin, or the energy storage system, or both the cabin and the energy storage system needs to be heated. The control unit can select to pass the thermal fluid from the heater to the cabin, or to the heat exchanger for heating the energy storage system, or to both. Thus, the excess heat can be selectively distributed to the cabin and/or the energy storage system.

According to some aspects, the control unit is configured to control the second valve so that the thermal fluid from the heater is distributed to the cabin and/or to the energy storage system based on information on whether heating of any of the cabin and the energy storage system is to be prioritized, and the determined actual need of heating of the cabin, and the determined actual need of heating of the energy storage system. For example, heating of the cabin can have higher priority than heating of the energy storage system, or heating of the energy storage system can have higher priority than heating of the cabin. This allows priority management, which can be advantageous.

According to some aspects, the second valve is a proportional valve configured so that the first and second outlets can be fully open or partially open at the same time and the thermal fluid from the heater can be distributed in varying degrees to the cabin and the heat exchanger. The first and second outlets from the second valve cannot only be fully open or fully closed, but also partially open. The first and second outlets can be partially open at the same time with the same, or different degrees of opening. This makes it possible to distribute the fluid from the heater to the cabin and/or the heat exchanger in dependence on their actual need of heating. Further, it is possible to perform priority management and to allow one of the cabin and the energy storage system to be heated more than the other.

Preferably, the second valve is configured so that the opening and closing of the first and second outlets can be controlled independently of each other and the degree of the opening can vary between the first and second outlets. Preferably, the second valve is a programmable valve.

According to some aspects, the cooling loop passes through an external passive cooling system, and the control unit is arranged to circulate the thermal fluid back to the passive cooling system when there is no excess heat in the thermal fluid, or if none of the energy storage system and the cabin needs to be heated. If the thermal fluid is not warm enough to contribute to the heating of the cabin and/or the energy storage system, the thermal fluid is kept circulating in the cooling loop while cooling the vehicle component. The thermal fluid is repeatedly circulated in the cooling loop until the control system determines that there is excess heat in the thermal fluid, i.e., the thermal fluid is warm enough to contribute to the heating of the cabin and/or the energy storage system, and any or both the energy storage system and the cabin needs to be heated.

According to some aspects, the first valve has an openable and closable second outlet in fluid communication with the external passive cooling system, and the control unit is arranged to control the opening and closing of the second outlet of the first valve so that the thermal fluid is circulated back to the passive cooling system when there is no excess heat in the thermal fluid, or if none of the energy storage system and the cabin needs to be heated. In this aspect, the first valve can be a three-way valve, or a corresponding valve or valve assembly having the same functionality.

According to some aspects, the first valve is a proportional valve configured so that the first and second outlets can be partially opened at the same time and the thermal fluid entering the inlet of the first valve can be distributed in varying degrees back to the passive cooling system and to the heater. Thus, a part of the fluid entering the inlet of the first valve can be passed on to the heater while the remaining part is returned to the passive cooling system. Accordingly, only the amount of heat needed for heating the cabin and/or the energy storage system is passed on to the heater.

According to some aspects, the control unit is configured to determine the actual need of heating of the cabin and the actual need of heating of the energy storage system based on the received data, and to control the degree of opening of the first outlet of the second valve in dependence on the determined actual need of heating of the cabin, and to control the degree of opening of the second outlet of the second valve in dependence on the determined actual need of heating of the energy storage system. This is advantageous since the energy in the fluid from the heater is used in an optimal way. Another added value is that the heating demand of the cabin or the energy storage system can be followed very precisely and independent from each other.

According to some aspects, the second valve is arranged with an inlet from the heater, a first outlet to the cabin and a second outlet to the heat exchanger, and the control unit is arranged to control the flow of thermal fluid through the second valve. The control unit thus controls the flow to the cabin and the energy storage system via the second valve. In other words, the control unit controls the second valve to control if the thermal fluid is to flow to the cabin, to the energy storage system or to both. Thus, it is possible to heat only one of the cabin and the energy storage system, or to heat both.

According to some aspects, the system comprises a heater temperature sensor arranged to measure the temperature of the thermal fluid entering the heater, and the control unit is arranged to receive the measured temperature from the heater temperature sensor and to determine if there is excess heat in the thermal fluid based on the received measured temperature of the thermal fluid from the first temperature sensor and the measured temperature from the heater temperature sensor. The heater temperature sensor is arranged to measure the temperature of the thermal fluid before it is heated by the heater. The heater temperature sensor can be disposed inside the heater or in a passage before the thermal fluid enters the heater.

According to some aspects, the control unit is arranged to determine if the measured temperature from the first temperature sensor is warmer than the measured temperature from the heater temperature sensor, and to control the opening and closing of the outlet of the first valve so that the thermal fluid entering the inlet of the first valve is provided to the heater when any of the energy storage system and the cabin needs to be heated and the measured temperature of the thermal fluid from the first temperature sensor is warmer than the measured temperature from the heater temperature sensor. The control unit is configured to determine that there is excess heat in the thermal fluid when the measured temperature of the thermal fluid from the first temperature sensor is warmer than the measured temperature from the heater temperature sensor. Thus, an efficient way of determining if there is excess heat in the thermal fluid that has been used for cooling the vehicle component, is achieved. If the measured temperature of the thermal fluid from the first temperature sensor is warmer than the measured temperature from the heater temperature sensor, the thermal fluid from cooling the vehicle component will be useful for heating the cabin and/or the energy storage system.

In other words, if the thermal fluid from cooling the vehicle component is warmer than the thermal fluid entering the heater, the thermal fluid from cooling the vehicle component would heat the thermal fluid entering the heater and accordingly there is excess heat in the thermal fluid from cooling the vehicle component.

According to some aspects, the heater temperature sensor is arranged to measure the temperature of the thermal fluid in the heater. The control unit is arranged to determine that there is excess heat in the thermal fluid if the measured temperature of the thermal fluid from the first temperature sensor is warmer than the measured temperature of the thermal fluid in the heater. If the measured temperature of the thermal fluid from the first temperature sensor is warmer than the measured temperature of the thermal fluid in the heater, the thermal fluid from cooling the vehicle component will be useful for heating the cabin and/or the energy storage system.

According to some aspects, the thermal management system comprises one cooling unit arranged to cool the cabin when the cabin is warmer than a user selected temperature and to provide cold to the heat exchanger for cooling the energy storage system when the energy storage system is warmer than a predetermined maximum temperature. The same cooling unit is thus used for cooling both the cabin and the energy storage system. By minimizing the number of heaters and cooling units, the weight of the unit is minimized. Since, during operation of the electric vehicle, it is the energy storage system that powers the heater and the cooling unit, it is also an advantage that only one heater and only one cooling unit is used for all heating and cooling. Cost is also reduced by having only one cooling unit.

According to some aspects, the thermal management system comprises a third valve arranged with an inlet from the energy storage system, a first outlet to the heat exchanger and a second outlet to an external passive cooling system, and wherein the control unit is arranged to control the opening and closing of the first outlet and second outlet of the third valve so that a third thermal fluid which is used to heat or cool the energy storage system is directed either to the heat exchanger or to the external passive cooling system.

In a case when there is no need to heat or cool the energy storage system, the control unit may control the third valve so that the thermal fluid does not pass the heat exchanger. The valve can also be controlled so that the fluid only passes the heat exchanger.

In this aspect, the third valve can be a three-way valve, or a corresponding valve or valve assembly having the same functionality.

According to some aspects, the thermal management system comprises a second temperature sensor, arranged to measure the temperature of the thermal fluid entering the third valve. The control unit is arranged to:
receive the measured temperature of the third thermal fluid from the second temperature sensor,
control the opening and closing of the first outlet and the second outlet of the third valve based on the received temperature.

With the measured temperature, together with the data associated with a measured temperature in the energy storage system, it is known if the energy storage system needs heating or cooling. The control unit may thus control the third valve based on the received data. It should be noted that the second temperature sensor may be external to the thermal management system.

According to some aspects, the first valve has a second openable and closable outlet and the thermal management system comprises a fourth valve. The control unit is arranged to:
control the opening and closing of the fourth valve so that it is opened when the first outlet of the first valve is opened and closed when the first outlet of the first valve is closed, and
control the opening and closing of the second outlet so that it is opened when the first outlet of the first valve is closed and opened when the first outlet of the first valve is closed.

With this, it is possible to have a loop for the thermal fluid for cooling the vehicle component when there is no excess heat in the thermal fluid or if the cabin or energy storage system does not need any heat.

According to some aspects, the thermal management system comprises one or more pumps and wherein the control unit is arranged to:
control the speed of the one or more pumps based on the received data and on the received measured temperature.

Thus, besides controlling one or more valves, the control unit may also control the flow of thermal fluid through one or more pumps. The control unit can thus have more control over the system and also use flow rate as a factor when heating or cooling.

According to some aspects, the heat exchanger is a chiller. A chiller is a plate-to-plate heat exchanger that transfers thermal energy from a thermal fluid to another thermal fluid, or from one fluid to several fluids.

The aim is also achieved by an electric vehicle as defined in claim 14. The vehicle comprises a cabin, an energy storage system, a vehicle component, a cooling loop (14a) including a thermal fluid for cooling the vehicle component (4), and the thermal management system according to the invention. The vehicle is, for example, of a short-distance type, such as bulldozers and excavators, which are carrying out work within a small area and not intended for long-distance travels. The vehicle can also be of a long-distance type, such as cars, busses and trucks, intended for transportation of people and/or goods.

BRIEF DESCRIPTION OF THE DRAWINGS

The invention will now be explained more closely by the description of different aspects and with reference to the appended figures.

DETAILED DESCRIPTION

Figure 1:
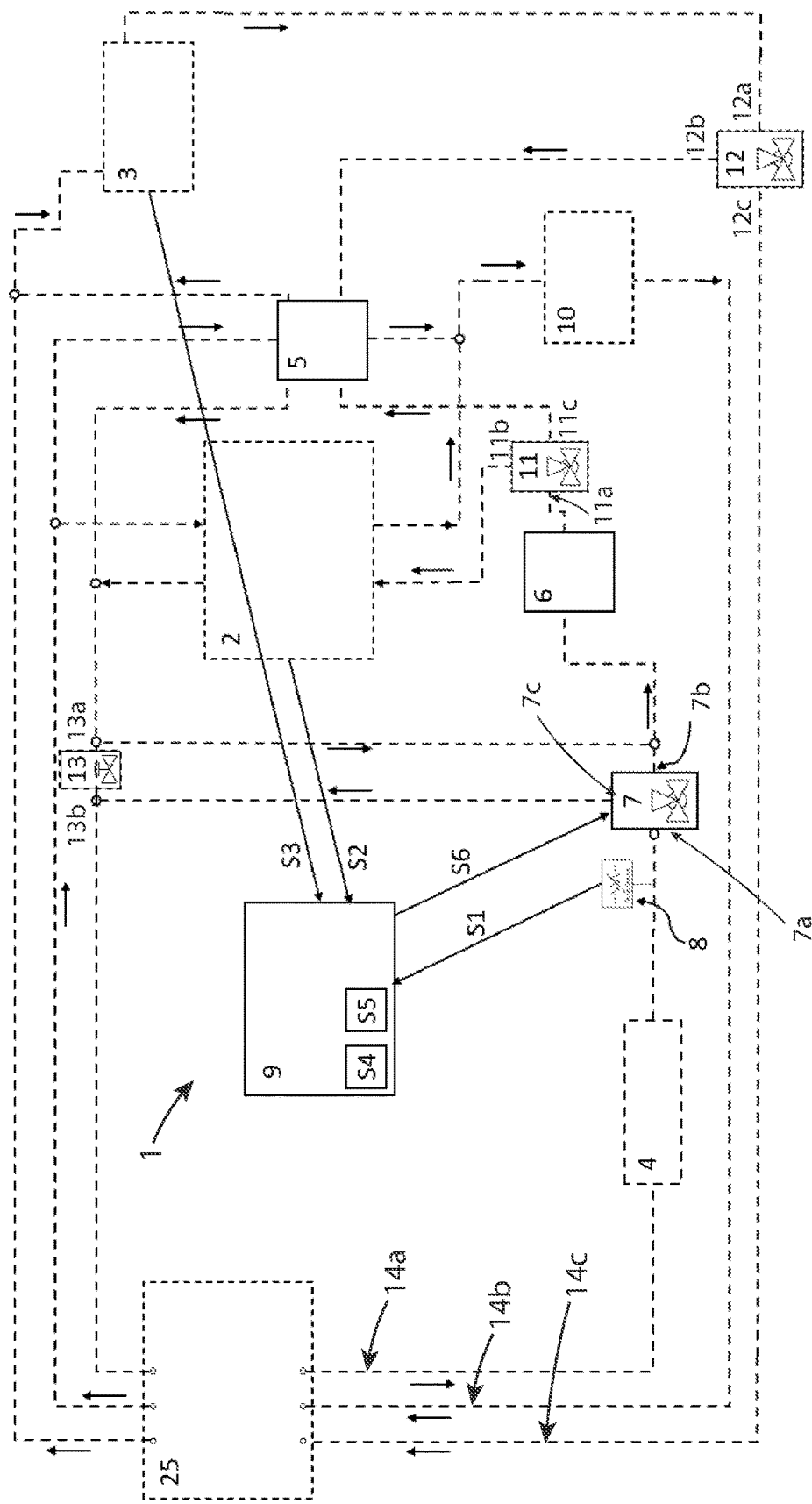
FIG. 1 shows a schematic diagram of an example thermal management system.

The present invention is not limited to the embodiments disclosed but may be varied and modified within the scope of the following claims. For example, pumps, temperature sensors and pressure sensors may be added to many different places in the thermal management system. Some examples of where it may be advantageous to add pumps, temperature sensors and/or pressure sensors are described below.

Aspects of the present disclosure will be described more fully hereinafter with reference to the accompanying drawings. The thermal management system disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the disclosure. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this disclosure belongs.

Components with dotted lines in the figures represent parts of the vehicle, such as, a cabin 2, an energy storage system 3, a vehicle component 4, and a passive cooling system 25, a cooling unit 10, a first cooling loop 14a including a first thermal fluid for cooling the vehicle component 4, a second cooling loop 14b including a second thermal fluid for cooling the cabin 2, and a third cooling loop 14c including a third thermal fluid for cooling the energy storage system 3. The cooling loops 14a-c pass through the passive cooling system 25 for cooling the thermal fluid in the cooling loops 14a-c. The first and third thermal fluids may comprise water and glycol, or oil. The second thermal fluid may comprise a refrigerant gas. The cooling loops 14a-c are illustrated as dotted lines, and arrows in connection with the lines show the flow directions of the thermal fluids. The thermal fluids are transported in passages in the cooling loops 14a-c. The passages being, for example, piping.

Components with continuous lines represent parts included in the thermal management system.

As also stated in the background section, an energy storage system is herein being defined as any kind of battery pack or series of batteries for powering the electric motor of the electric vehicle. In other words, when the term energy storage system is used in this disclosure, a singular battery or a plurality of batteries is included in the term. An energy storage system for an electric vehicle usually comprises several batteries in series.

The vehicle component is any component of the electric vehicle that requires cooling with a thermal fluid. For example, the vehicle component can be any kind of e-motor, inverter, or DC/DC converter.

FIG. 1 shows a schematic diagram of an example thermal management system 1. The thermal management system 1 is for controlling the temperature in a cabin 2 and an energy storage system 3 of an electric vehicle including a vehicle component 4.

The thermal management system 1 comprises one heat exchanger 5 arranged to heat the energy storage system 3, one heater 6 arranged to heat the cabin 2 when the cabin temperature is colder than a user selected temperature, and to provide heat to the heat exchanger 5 when the energy storage system 3 is colder than a minimum temperature. It should be noted that the same heater 6 is used to heat both the cabin 2 and the energy storage system 3. The heater is powered by the energy storage system 3 but it may also be powered by an external power source when the electric vehicle is connected to such, for example when it is charging.

The heat exchanger 5 is arranged to transfer thermal energy from a thermal fluid to another thermal fluid, or from one fluid to several fluids. The heat exchanger 5 is, for example, a chiller. A chiller is a plate-to-plate heat exchanger that transfers thermal energy from a thermal fluid to another thermal fluid, or from one fluid to several fluids. The heater 6 is, for example, a high voltage heater, a Low-Voltage resistor heater, a PTC-type heater, or an AC-powered heater. It could also be the condensing part of a heat-pump system. The heater 6 may be any heater for heating thermal fluids suitable to be arranged in an electric vehicle.

The system 1 comprises a first valve 7 disposed in the cooling loop 14a after the vehicle component 4. The first valve 7 has an inlet 7a arranged to receive the thermal fluid from the vehicle component 4, which thermal fluid has been used for cooling the vehicle component 4. The first valve 7 has an openable and closable first outlet 7b in fluid communication with the heater 6. In other words, the first valve 7 receives thermal fluid that has been used to cool the vehicle component 4 of the electric vehicle. The first valve 7 has an openable and closable second outlet 7c arranged to circle thermal fluid back to the passive cooling system 25. Preferably, the first valve is of a type that makes it possible to control the opening and closing of the first and second outlets independently of each other so that it is possible to have both outlets opened at the same time, one of the outlets open and the other closed, and to control how much each output is to be opened. Thus, it is possible to control the size of the portions of the flow passing through each of the outlets.

The thermal fluid is transported in a passage in the first cooling loop 14a, the passage being for example piping. The thermal fluid in the first cooling loop 14a passes through the passive cooling system 25 and further to the vehicle component 4 for cooling the vehicle component. The fluid passes the vehicle component 4 and flows further to the inlet 7a of the first valve 7. The fluid can then be passed to the heater 6 via the first outlet 7b or can be circled back to the passive cooling system 25 via the second outlet 7c of the first valve 7. The thermal fluid passes on to the heater 6 if the first outlet 7b is open, otherwise the thermal fluid is passed back to the cooling system 25.

The first valve 7 can be any kind of valve of valve assembly with one inlet and two outlets. For example, the valve 7 is a three-way valve. The valve 7 is a valve that can be controlled via signals from a control unit, either via wire or wireless signals. The same applies to the second and the third valves 11, 12 described below. For example, the first valve 7 is a proportional valve configured so that the first and second outlets 7b, 7c can be partially opened at the same time and the thermal fluid entering the inlet 7a of the first valve 7 can be distributed in varying degrees back to the passive cooling system and to the heater. Thus, only a part of the fluid can be passed on to the heater while the remaining part is returned to the passive cooling system.

The thermal management system 1 comprises a control unit 9 for controlling components, such as valves and pumps, of the thermal management system 1.

The system 1 comprises a first temperature sensor 8 arranged in the first cooling loop 14a for measuring the temperature of the thermal fluid entering the inlet 7a of the first valve. The temperature sensor 8 is arranged to measure the temperature of the thermal fluid that has been used for cooling the vehicle component 4, which thermal fluid is received by the first valve 7. The first temperature sensor 8 is, for example, arranged in the first valve 7 or in a passage, such as a pipe, before the thermal fluid enters the first valve 7.

The thermal management system 1 comprises a second valve 11 which can be used to selectively pass the thermal fluid from the heater 6 to the cabin for heating the cabin, or to the heat exchanger 5 for heating the energy storage system, or to both. The second valve 11 has an inlet 11a arranged to receive thermal fluid from the heater 6 and openable and closable first outlet 11b connected to the cabin 2 and arranged to pass the thermal fluid from the heater 6 to the cabin 2 when it is opened. The second valve 11 has an openable and closable second outlet 11c connected to the heat exchanger 5 and arranged to pass the thermal fluid from the heater 6 to the heat exchanger 5 when it is opened. The control unit 9 is configured to control the valve 11, and accordingly control whether the thermal fluid from the heater 6 is to be used to heat the cabin 2 or the energy storage system 3, or both, or is able to put more heat to one of the both.

The vehicle comprises a second cooling loop 14b for cooling the cabin 2. The second cooling loop 14b directs the fluid from the passive cooling system 25 to the cabin, from the cabin through the cooling unit 10, and then back to the passive cooling system 25. The second cooling system may also be used to cool the energy storage system 3 via the heat exchanger 5.

The vehicle comprises a third cooling loop 14c for cooling the energy storage system 3 when it needs cooling. The third cooling loop 14c directs the fluid from the passive cooling system 25 to the energy storage system 3, through the energy storage system 3 and then back to the cooling system 25. The thermal management system may comprise a third valve 12 for directing the third thermal fluid to the heat exchanger 5. The third valve 12 comprises one inlet 12a and a first and a second openable and closable outlet 12b, 12c. The third valve 12 can be used to selectively pass the thermal fluid from the energy storage system 3 to the heat exchanger 5 via the first outlet 12b, or back to the passive cooling system 25 via the second outlet 12c. The third thermal fluid from the second outlet 12c of the third valve 12 can be both heated and cooled at the heat exchanger 5. When the third thermal fluid is to be cooled, it is cooled via the heat exchanger 5 by the second thermal fluid, and when third thermal fluid is heated, it is heated via the heat exchanger 5 by the thermal fluid from the heater 6. The control unit 9 is configured to control the third valve 12, and accordingly control whether the thermal fluid from the energy storage system 3 is to be passed to the heat exchanger 5 or to the passive cooling system 25.

Figure 6:
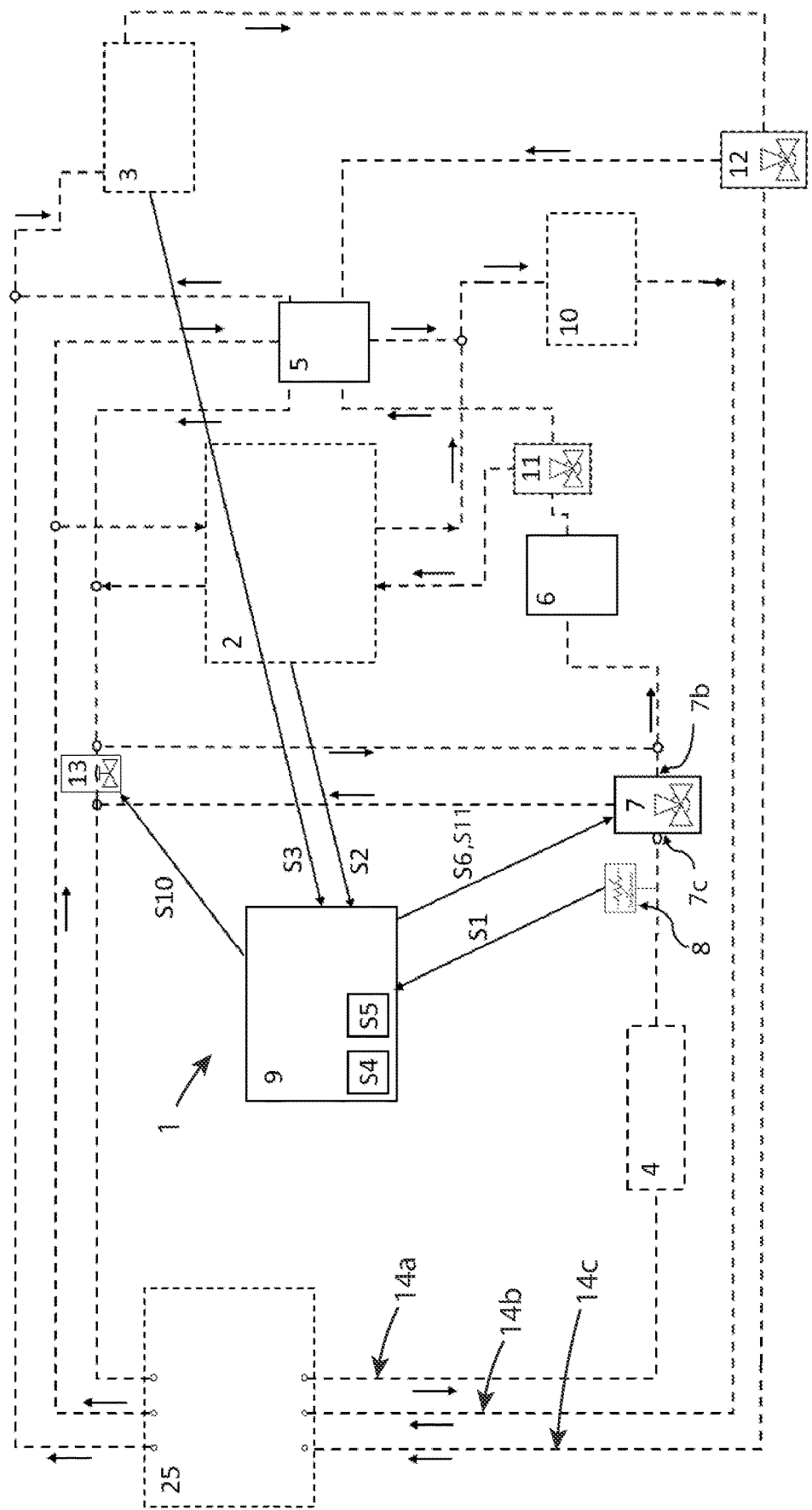
FIG. 6 shows a schematic diagram of an example thermal management system with added control of an additional valve.

The thermal management system 1 may further comprise a fourth valve 13 having an inlet 13a connected to the first outlet 7b of the first valve 7 and an outlet 13b connected to the passive cooling system 25. The control unit 9 can then be arranged to control S10 the opening and closing of the fourth valve 13 so that it is opened when the first outlet 7b of the first valve 7 is opened, and closed when the first outlet 7b of the first valve 7 is closed, and to control S11 the opening and closing of the second outlet 7c so that it is opened when the first outlet 7b of the first valve 7 is closed and closed when the first outlet 7b of the first valve 7 is opened, as shown in FIG. 6.

With this, it is possible to circulate the first thermal fluid in the first cooling loop 14a for cooling the vehicle component 4 when there is no excess heat in the thermal fluid, or if the cabin 2 or energy storage system 3 does not need any heat. The first thermal fluid is kept circulating in the first cooling loop 14a until any of the cabin 2 and energy storage system 3 needs heating and there is excess heat in the thermal fluid.

The control unit 9 is arranged to:
receive S1 the measured temperature of the thermal fluid from the first temperature sensor 8,
receive S2 data associated with a measured temperature in the cabin 2,
receive S3 data associated with a measured temperature in the energy storage system 3,
determine S4 if any of the cabin 2 or the energy storage system 3 needs to be heated, based on the received data,
determine S5 if there is excess heat in the thermal fluid entering the first valve 7 based on the received measured temperature of the thermal fluid from the first temperature sensor 8,
control S6 the opening and closing of the first outlet 7b of the first valve 7 so that the thermal fluid is provided to the heater 6 via the first outlet 7b of the first valve 7 when there is excess heat in the thermal fluid and any of the energy storage system 3 and the cabin 2 needs heating, and
control S7 the second valve 11 so that the thermal fluid from the heater 6 is distributed to the cabin 2 and/or to the heat exchanger 5 based on the need of heating of the cabin and the energy storage system.

The control unit is configured to determine if there is excess heat in the thermal fluid entering the first valve 7. This can be done in different ways. One simple way to determine if there is excess heat in the thermal fluid is to compare the measured temperature from the first temperature sensor with a predetermined limit value. In such case, the thermal fluid entering the first valve is distributed to the heater when measured temperature from the first temperature sensor is above the limit value, and any of the energy storage system and the cabin needs to be heated, and the thermal fluid entering the first valve is distributed back to the passive cooling system 25 when measured temperature from the first temperature sensor is below the limit value.

Another alternative is to measure the temperature of the thermal fluid entering the heater 6, and to determine if there is excess heat in the thermal fluid based on the difference between the measured temperature of the thermal fluid entering the first valve 7 and the measured temperature of the thermal fluid entering the heater.

A further alternative is to calculate how much heat energy it is in the fluid entering the first valve. For example, the available heat energy can be calculated based on the current flow of the thermal fluid (normally in litres per minute) in the first cooling loop 14a and the temperature of the thermal fluid entering the first valve 7. The current flow of fluid can be determined based on the speed of the pumps in first cooling loop 14a.

The heating demand of the energy storage system and the cabin is known based on the specification of the components and the current need, and it is possible to calculate how much "heat" is needed to add via the heater to heat the thermal fluid or to keep it at steady state.

The thermal management system 1 is arranged so that excess heat from cooling the vehicle component 4 can be used for heating the cabin 2 and the energy storage system 3. The same heater 6 in the system is used to heat both the cabin 2 and the energy storage system 3. Using the data from the temperature sensor and input data associated with a measured temperature in the cabin 2 and the energy storage system 3, the control unit 9 can control the first valve 7 so that excess heat from the vehicle component 4 can be used in the cabin 2, the energy storage system 3, or in both.

The control unit 9 can, for example, be configured to control the second valve 11 so that the thermal fluid from the heater 6 is distributed to the cabin 2 and/or to the energy storage system 3 based on information on whether heating of any of the cabin and the energy storage system is to be prioritized, and the determined actual need of heating of the cabin, and the determined actual need of heating of the energy storage system. For example, heating of the cabin can have higher priority than heating of the energy storage system, or heating of the energy storage system can have higher priority than heating of the cabin. This allows priority management, which can be advantageous. For example, the cabin needs normally only 5 kW of cooling performance and the battery needs 10 kW: and the system has one heater with 10 kW—due to the need of the battery—it is possible to prioritize the heating of the cabin and use this 10 kW only for the cabin and thus heat it up very quickly, and to start heating the battery after the cabin has been heated to a desired temperature. The information regarding priority of the heating can, for example, be received by the control unit 9 in the form of a priority command from a user of the vehicle, or can be stored as in a data storage of the control unit 9, as a predetermined priority choice.

By minimizing the number of heaters, the weight of the system is minimized. Furthermore, during operation of the electric vehicle, it is the energy storage system 3 that powers any heater. Therefore, it is also an advantage that only one heater 6 is used for all heating in the thermal management system 1. Cost is also reduced by having only one heater 6.

The steps S1 to S6 are illustrated in FIG. 1. The control unit 9 comprises processing circuitry for processing data and either comprises communication circuitry or is connected to communication circuitry for receiving sensor data and sending instructions for the components it is controlling. Communication between the control unit 9 and the components, i.e. any valves, pumps, pressure sensors and/or thermal expansion valves, may comprise wired or wireless communication.

The control unit 9 comprises processing circuitry for processing sensor data received from the first sensor, the cabin, and the energy storage system 3 and for sending instructions to the components it is controlling, such as the valves 7, 11, 12, and 13. The control unit 9 may comprise software code portions, such as a computer program, comprising instructions for processing the sensor data and to generate control signals to the components it is controlling, and hardware, such as a processor, memory and input/output devices, for carrying out the instructions of the software code portions.

The data associated with a measured temperature in the cabin 2 may be data indicating an actual temperature in the cabin 2 or a number of degrees that the cabin 2 is differing from a desired temperature. For example, if the cabin 2 is set to be 22° C. to be comfortable to an operator of the electric vehicle, and the actual temperature is 20° C., the data associated with a measured temperature in the cabin 2 may be 20° C. In such a case the control unit 9 compares the desired temperature to the measured temperature to determine that more heat is needed. It may also be that the data associated with a measured temperature in the cabin 2 is −2° C. to indicate that the cabin 2 needs two more degrees to reach the desired temperature. It may also be that the data associated with a measured temperature only gives an indication that more heat is needed, without a specific number.

It may also be that the data associated with a measured temperature is given in percent where, for example, 0% is an indication that no heating or cooling is required, and each percent represents a predetermined number of degrees to be changed.

The data associated with a measured temperature in the energy storage system 3 may be in a corresponding form. Either an actual temperature is sent to the control unit 9, and in the case of large battery packs, the actual temperature may be an average of several temperature sensors arranged in different locations in the energy storage system 3, or the difference between the actual temperature is sent, or only an indication of whether the energy storage system 3 needs to be heated is sent.

The data associated with a measured temperature in the cabin 2 and the energy storage system 3 may also be indicated in other ways than described above.

To determine S4 if any of the cabin 2 or the energy storage system 3 is to be heated, based on the received data, may be different depending on in which way the received data indicates the measured temperature as discussed above. If an actual temperature of the cabin 2 or energy storage system 3 is received, determining S4 if any of the cabin 2 or the energy storage system 3 is to be heated may comprise comparing the received data to a reference list or to a previously received desired temperature of the cabin 2. If it is a difference in desired temperature and actual temperature, the determining may be to detect if the cabin 2 or energy storage system 3 is too warm or too cold. If the data associated with a measured temperature only gives an indication that more heat is needed, then the determining may only be to check the received data.

To control S6 the opening and closing of the first outlet 7b of the first valve 7, so that the thermal fluid is provided to the heater 6 via the first outlet 7b of the first valve 7 when there is excess heat in the thermal fluid and any of the energy storage system 3 and the cabin 2 is to be heated, may comprise to send a signal to the valve with instructions to open the first outlet 7b. This is done when the thermal fluid from the vehicle component 4 is so warm that it can be used to heat the cabin 2 or the energy storage system 3.

The control unit 9 may also be arranged to communicate with the electric vehicle and receive instructions, give feedback to the electric vehicle, as well as receive and transmit states of the electric vehicle and the thermal management system and potential errors in the thermal management system 1 or the used components.

It should be noted that there are parts illustrated in the FIGS. 1-7 that are not parts of the thermal management system 1. For example, the vehicle component 4, and its cooling system with thermal fluid, are parts of the vehicle. Also, a passive cooling system 25, is often present in electric vehicles but is not part of the described thermal management system 1. The cabin 2 and the heating and cooling system, e.g. HVAC, of the cabin 2 are parts of the vehicle and are not included in the thermal management system 1. A cooling unit 10 is optional in the system and is described below. Valves 11, 12 and 13 are also optional for the system.

In FIG. 1, an example of how the thermal management system 1 can be connected to parts in the vehicle is illustrated. Three cooling loops 14a-c for cooling are passing the passive cooling system 25 of the vehicle. The first cooling loop 14a is used to cool the vehicle component 4 of the electric vehicle. The thermal management system 1 comprises a temperature sensor 8 to determine if there is excess heat in the thermal fluid. This means to determine if the thermal fluid used for cooling the external component is warm enough to contribute to the heating of the cabin and the energy storage system. If not, the thermal fluid can be circled back to the passive cooling system 25 via the second outlet 7c of the first valve 7. If there is excess heat, the thermal fluid can be passed on to the heater 6, via the first outlet 7b of the valve 7 so that the heater can heat the thermal fluid less than without the heat from the thermal fluid from the vehicle component. In this example, the thermal management system 1 comprises a second valve 11 which can be used to control if the thermal fluid should be used to heat the cabin, or the energy storage system via the heat exchanger, or both.

The second cooling loop 14b passes the passive cooling system 25 and goes via the cooling unit 10, and a second thermal fluid in second cooling loop 14b is used to cool the cabin and/or the energy storage system via the heat exchanger 5.

The thermal management system may comprise a third valve 12. The third cooling loop 14c is used for cooling the energy storage system and is selectively connected to the heat exchanger 5 via the third valve 12. The third thermal fluid of the third cooling loop 14c can be both heated and cooled at the heat exchanger. When it is to be cooled, it is cooled via the heat exchanger by the second thermal fluid and when it is heated, it is heated via the heat exchanger by the thermal fluid from the heater 6.

Figure 2:
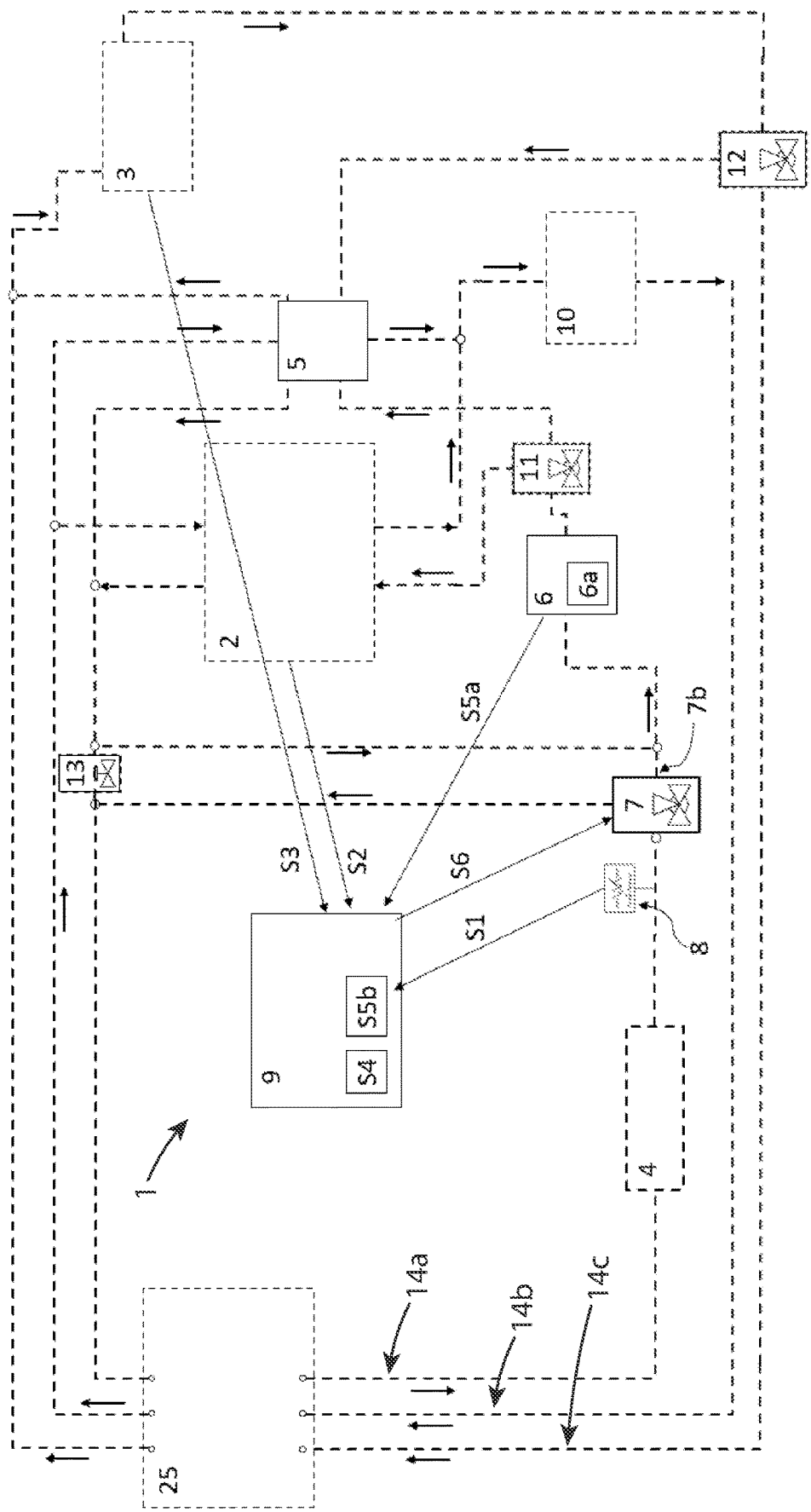
FIG. 2 shows a schematic diagram of an example thermal management system with added input of a temperature sensor.

The thermal management system may comprise a heater temperature sensor 6a arranged to measure the temperature of the thermal fluid entering the heater 6. The control unit 9 is arranged to receive (S5a) the measured temperature from the heater temperature sensor 6a and to determine (S5) if there is excess heat in the thermal fluid based on the received measured temperature from the first temperature sensor 8 and the measured temperature from the heater temperature sensor 6a. The heater temperature sensor 6a is arranged to measure the temperature of the thermal fluid before it is heated by the heater. The heater temperature sensor 6a can be disposed inside the heater 6 so that the heater temperature sensor 6a measures the temperature of the thermal fluid in the heater 6, as illustrated in FIG. 2. The heater temperature sensor 6a may also be arranged outside of the heater 6 as a separate component. The heater temperature sensor 6a can, for example, be arranged in a passage, e.g. piping, before the thermal fluid enters the heater 6. The heater may include a heater element arranged in a casing, and the heater temperature sensor 6a can be arranged in the same casing as the heater element.

In an alternative embodiment, the system may comprise a second heater temperature sensor arranged to measure the temperature of the thermal fluid leaving the heater, and the control unit is configured to determine whether there is excess heat in the thermal fluid based on the measured temperatures from the first and second heater temperature sensors. The first and second heater temperature sensors can both be arranged in the same casing as the heater element. It is advantageous to measure the temperature before as well as after the heater, since it makes it possible to calculate backwards the heating power applied—as the volume flow is known—and it is possible to check with this calculation if the heater is working properly.

With the knowledge of the outlet temperature, the temperature in the fluid after it has been heated is known.

In that case, to determine S5 if there is excess heat in the thermal fluid based on the received measured temperature of the thermal fluid comprises to receive S5a the measured temperature of the thermal fluid from the heater temperature sensor, and to determine S5b if the measured temperature of the thermal fluid from the first temperature sensor 8 is warmer than the measured temperature of the thermal fluid in the heater 6. Thus, an efficient way of determining if there is excess heat in the thermal fluid that has been used for cooling the vehicle component, is achieved. If the measured temperature of the thermal fluid from the first temperature sensor is warmer than the measured temperature of the thermal fluid in the heater, the thermal fluid from cooling the vehicle component will be useful for heating the cabin and/or the energy storage system. In other words, if the thermal fluid from cooling the vehicle component is warmer than the thermal fluid entering the heater, the thermal fluid from cooling the vehicle component would heat the thermal fluid entering the heater and accordingly there is excess heat in the thermal fluid from cooling the vehicle component.

An alternative way to determine S5, if there is excess heat in the thermal fluid used for cooling the vehicle component 4 based on the received measured temperature of the thermal fluid, is to compare the received measured temperature in the thermal fluid used for cooling the vehicle component 4 to a temperature of the thermal fluid measured at a fourth temperature sensor 18, which is described further below in association with FIG. 8.

The thermal management system 1 may comprise one cooling unit 10 arranged to cool the cabin 2 when the cabin 2 is warmer than a user selected temperature and to provide cold to the heat exchanger 5 for cooling the energy storage system 3 when the energy storage system 3 is warmer than a predetermined maximum temperature. The same cooling unit 10 is thus used for cooling both the cabin 2 and the energy storage system 3. By minimizing the number of heaters and cooling units, the weight of the unit is minimized. Since, during operation of the electric vehicle, it is the energy storage system 3 that powers the heater 6 and the cooling unit 10, it is also an advantage that only one heater 6, and only one cooling unit 10 is used for all heating and cooling. The cost of the system is also minimized by having only one heater 6 and one cooling unit 10.

The cooling unit 10 is, for example, a compressor which, together with a thermal expansion valve arranged in association with an evaporator in the cabin and the heat exchanger, forms two refrigeration machines. In such a case, the second cooling loop 14b that is connected to the compressor 10 is for transporting a second thermal fluid in the form of a thermal vapor. The cooling unit 10 may also be a heat-pump system.

The control unit 9 may also be arranged to control the power to the heater 6 and thus how much the thermal fluid flowing through the heater 6 should be heated. The control may be based on the same parameters as the control of the first valve 7, i.e. the temperature of the thermal fluid and the data associated with the temperature of the cabin 2 and/or energy storage system 3.

Figure 3:
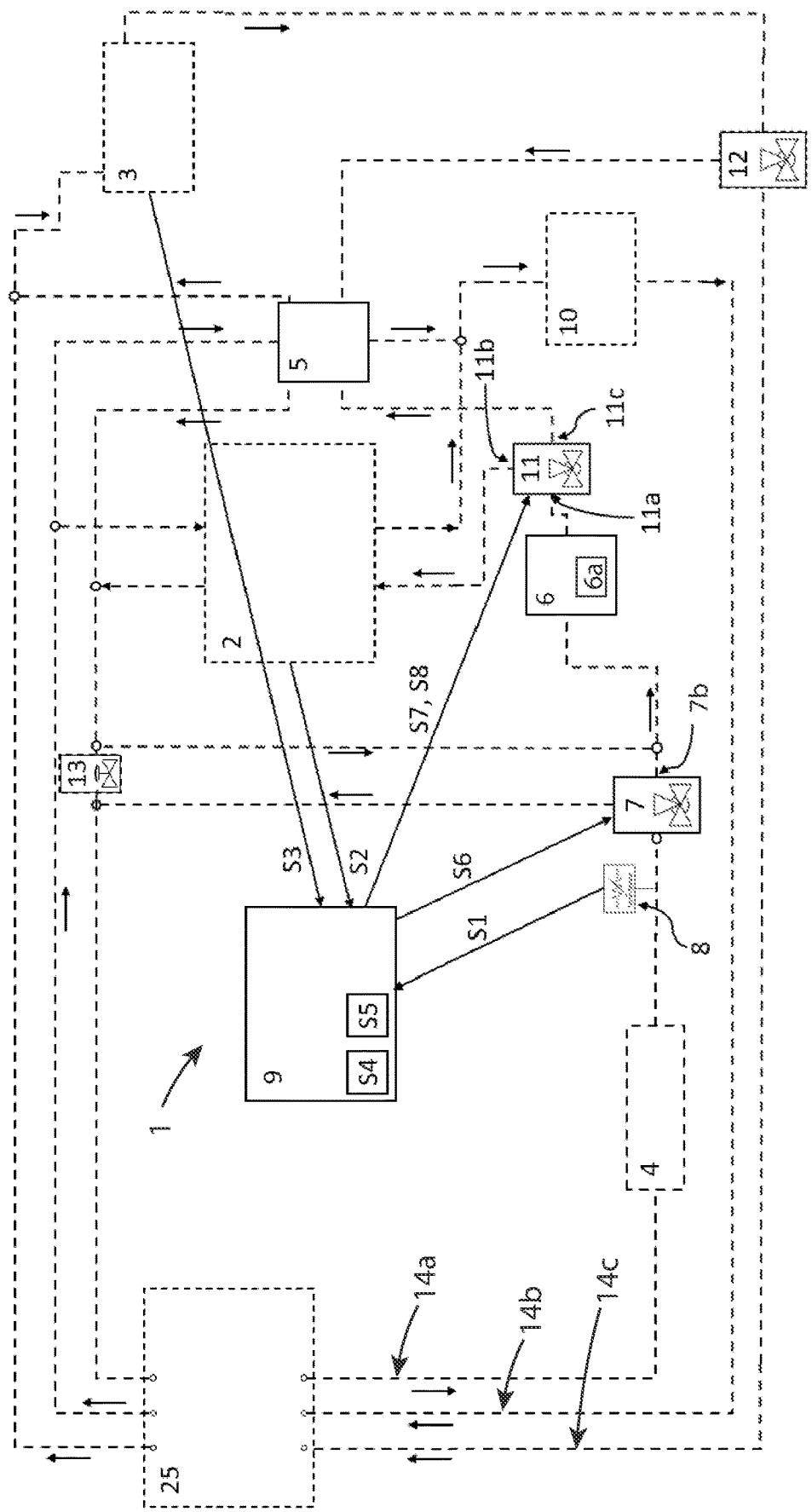
FIG. 3 shows a schematic diagram of an example thermal management system with added control of an additional valve.

FIG. 3 shows a schematic diagram of an example thermal management system 1 with added control of an additional valve. The thermal management system 1 may comprise a second valve 11, which can be a three-way valve, arranged with an inlet 11a from the heater 6, a first outlet 11b to the cabin 2 and a second outlet 11c to the heat exchanger 5, and the control unit 9 is arranged to control the flow of thermal fluid through the second valve 11. The control unit 9 thus controls the flow to the cabin 2 and the energy storage system 3 via the second valve 11. In other words, the control unit 9 controls the second valve 11 and thus if the thermal fluid is to flow from the heater 6 to the cabin 2, to the energy storage system 3 or to both.

To control the second valve 11, the control unit 9 may be arranged to control S7 the opening and closing of the first outlet 11b of the second valve 11 so that the thermal fluid is provided to the cabin 2 when there is excess heat in the thermal fluid, and the cabin 2 is to be heated, and to control S8 the opening and closing of the second outlet 11c of the second valve 11 so that the thermal fluid is provided to the heat exchanger 5 when there is excess heat in the thermal fluid and the energy storage system 3 is to be heated.

For example, the second valve 11 is a proportional valve configured so that the first and second outlets 11b, 11c can be fully opened or partially opened at the same time and the thermal fluid from the heater 6 can be distributed in varying degrees to the cabin and to the heat exchanger. The second valve 11 is preferably a programmable valve. Preferably, the second valve is configured so that the opening and closing of the first and second outlets 11b, 11c can be controlled independently of each other and the degree of the opening can vary between the first and second outlets. This makes it possible to distribute the fluid from the heater to cabin and/or the heat exchanger in dependence on their actual need of heating.

In one aspect, the control unit 9 is configured to:
determine the actual need of heating of the cabin 2 based on the received data associated with the measured temperature in the cabin and a user selected temperature in the cabin,
determine the actual need of heating of the energy storage system based on the received data associated with a measured temperature in the energy storage system and the minimum temperature,
control the degree of opening of the first outlet 11b of the second valve in dependence on the determined actual need of heating of the cabin 2, and
control the degree of opening of the second outlet 11c of the second valve in dependence on the determined actual need of heating of the energy storage system.

The need of heating the cabin and the energy storage system can be calculated in different ways. For the battery, the needed heating power for raising the battery temp by 1° C. in a certain time is normally known from the OEM/the battery manufacturer. That value can be used for calculation of the need of heating, together with the ambient temp. Alternatively, the current battery temp and the desired battery temp is known, and we just heat full speed (as much power as available) to achieve the desired temp of the battery. For the cabin, this is normally done by the Climate ECU inside of the cabin. From this a % heating value is received. As we know the heating demand it is easy to achieve 100% value in the calculation.

Figure 4:
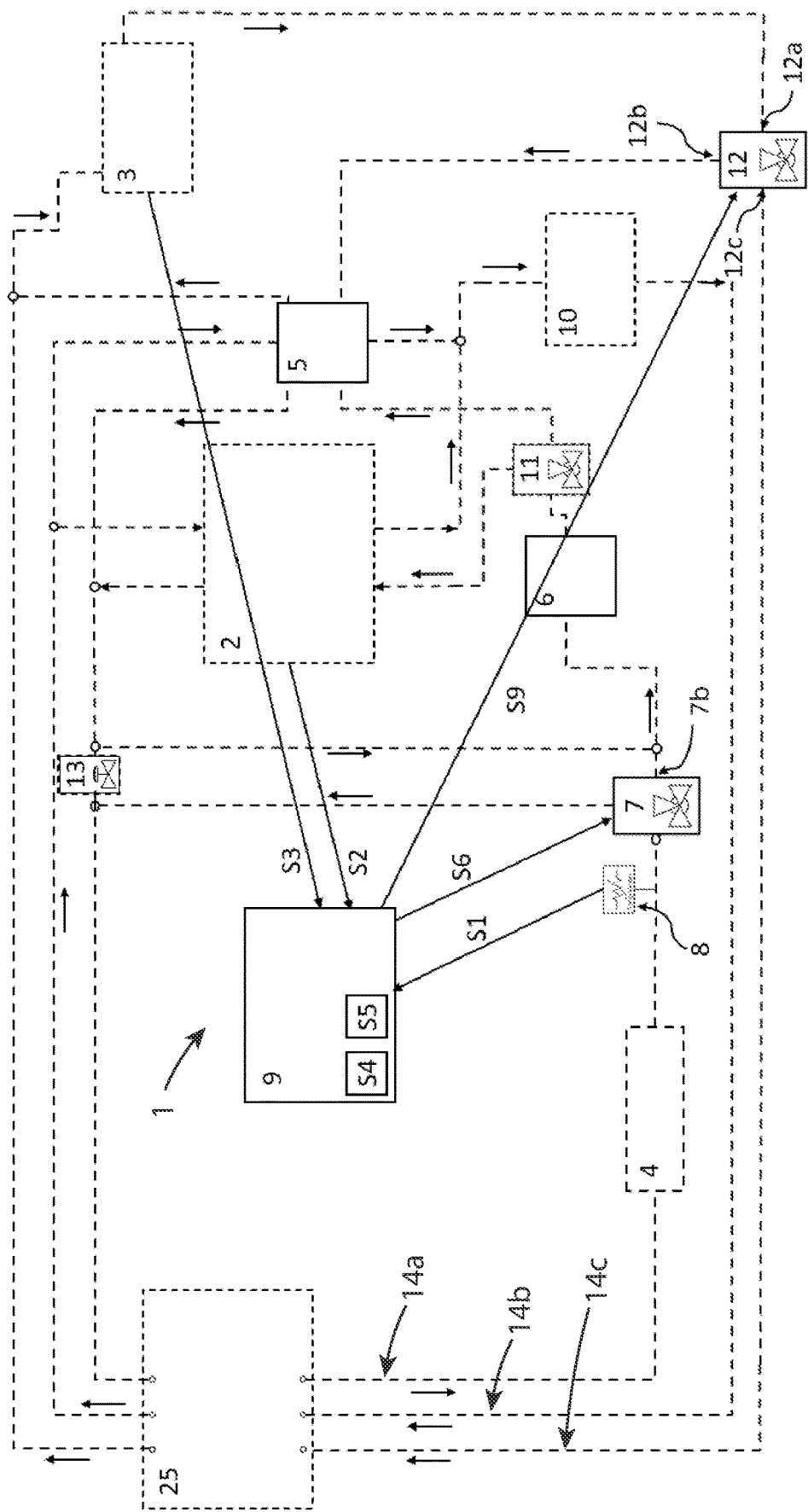
FIG. 4 shows a schematic diagram of an example thermal management system with added control of an additional valve.

FIG. 4 shows a schematic diagram of an example thermal management system 1 with added control of an additional valve. The thermal management system 1 may comprise a third valve 12, which can be a three-way valve, arranged with an inlet 12a from the energy storage system 3, a first outlet 12b to the heat exchanger 5 and a second outlet 12c to a passive cooling system 25 of the vehicle, and wherein the control unit 9 is arranged to control S9 the opening and closing of the first outlet 12b and second outlet 12c of the third valve 12 so that a second thermal fluid which is used to heat or cool the energy storage system 3 is directed either to the heat exchanger 5 or to the passive cooling system 25. In a case when there is no need to heat or cool the energy storage system 3, the control unit 9 may control the third valve 12 so that the thermal fluid does not pass the heat exchanger 5, i.e. close the first outlet 12b. The valve can also be controlled so that the fluid only passes the heat exchanger 5, i.e., open the first outlet 12b and close the second outlet 12c.

Figure 5:
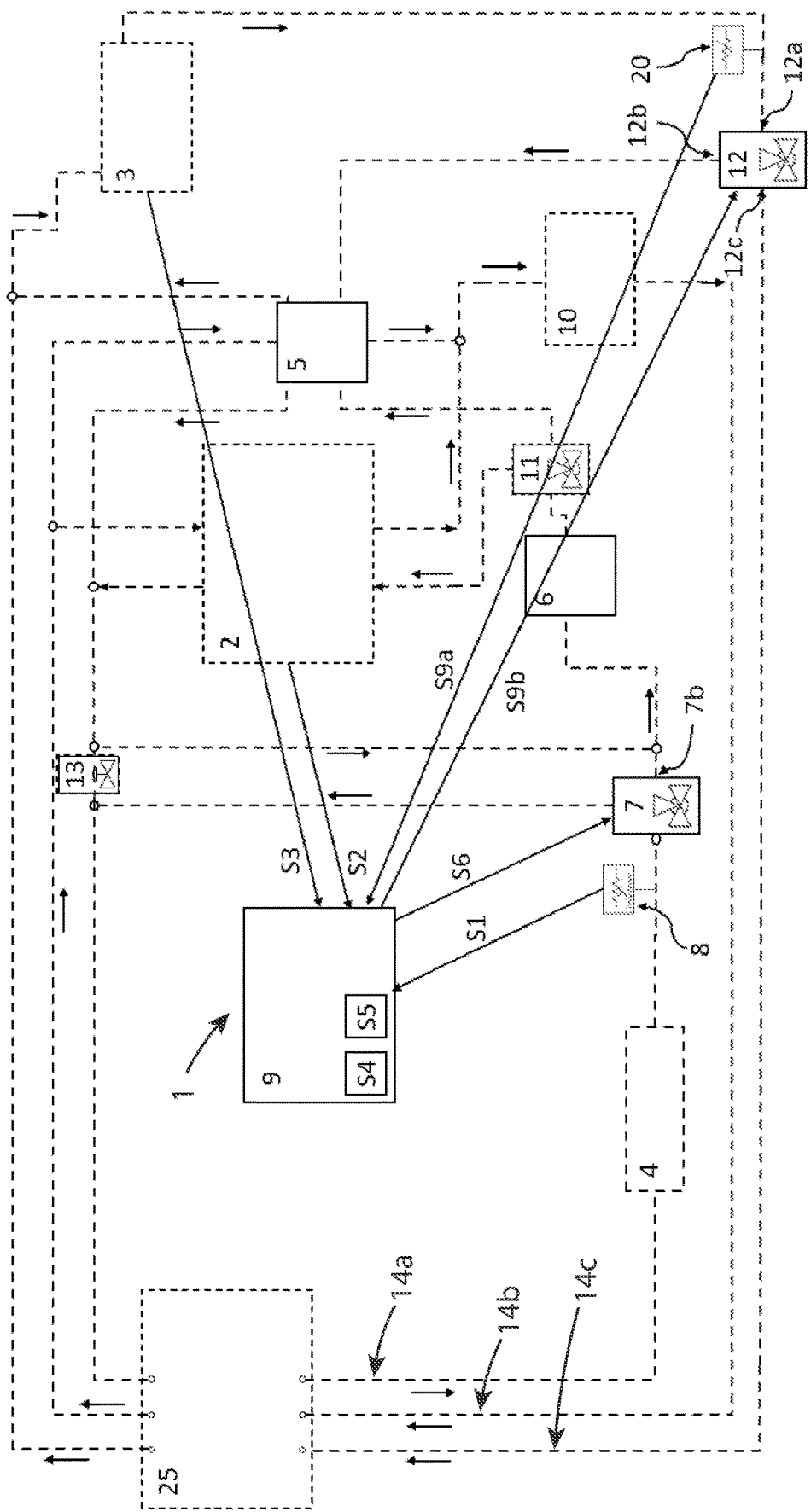
FIG. 5 shows a schematic diagram of an example thermal management system with added input of an additional temperature sensor.

FIG. 5 shows a schematic diagram of an example thermal management system 1 with added input of an additional temperature sensor. The thermal management system 1 may comprise a second temperature sensor 20, arranged to measure the temperature of the thermal fluid entering the third valve 12. The control unit 9 is then arranged to receive S9a the measured temperature of the thermal fluid from the second temperature sensor 20 and to control S9b the opening and closing of the first outlet 12b and the second outlet 12c of the third valve 12 based on the received temperature.

With the measured temperature, together with the data associated with a measured temperature in the energy storage system 3, it is known if the energy storage system 3 needs heating or cooling. The control unit 9 may thus control the third valve 12 based on the received data. It should be noted that the second temperature sensor 20 may be a part of the vehicle comprising the thermal management system 1.

FIG. 6 shows a schematic diagram of an example thermal management system 1 with added control of an additional valve. The first valve 7 has a second openable and closable outlet 7c. The thermal management system 1 comprises a fourth valve 13. The control unit 9 is then arranged to control S10 the opening and closing of the fourth valve 13 so that it is opened when the first outlet 7b of the first valve 7 is opened, and closed when the first outlet 7b of the first valve 7 is closed, and to control S11 the opening and closing of the second outlet 7c so that it is opened when the first outlet 7b of the first valve 7 is closed and opened when the first outlet 7b of the first valve 7 is closed.

With this, it is possible to have a loop for the thermal fluid for cooling the vehicle component 4 when there is no excess heat in the thermal fluid or if the cabin 2 or energy storage system 3 does not need any heat. As can be seen in FIG. 6, if the first valve 7 and the fourth valve 13 are both closed, a loop where the vehicle component 4 is cooled via the passive cooling system 25 is created. When both valves 7, 13 are open, the thermal fluid from cooling the vehicle component 4 is used to heat the cabin 2 or the energy storage system 3 or both.

Figure 7:
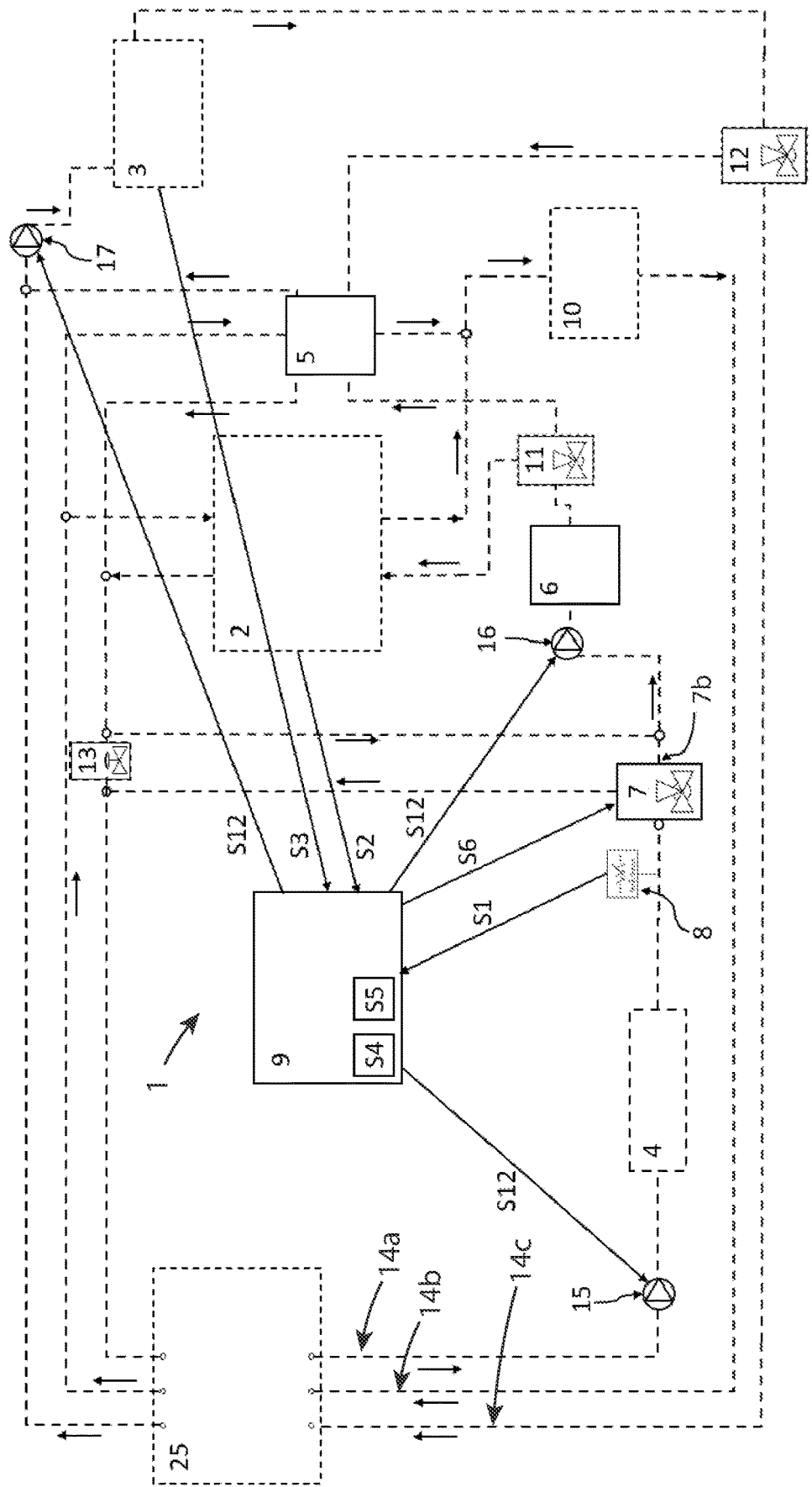
FIG. 7 shows a schematic diagram of an example thermal management system with added control of one or more pumps.

FIG. 7 shows a schematic diagram of an example thermal management system 1 with added control of one or more pumps 15, 16, 17. The thermal management system 1 may comprise one or more pumps 15, 16, 17 and the control unit 9 is then arranged to control S12 the speed of the one or more pumps 15, 16, 17 based on the received data and the received measured temperature. Thus, besides controlling one or more valves, the control unit 9 may also control the flow of thermal fluid through one or more pumps 15, 16, 17. The control unit 9 can thus have more control over the system and also use flow rate as a factor when heating or cooling. The first pump 15, the second pump 16 and the third pump 17 may be added to the system independently from each other.

The controlling of all valves and pumps may also be based on the selected temperature and the predetermined minimum temperature of the energy storage system 3.

Figure 8:
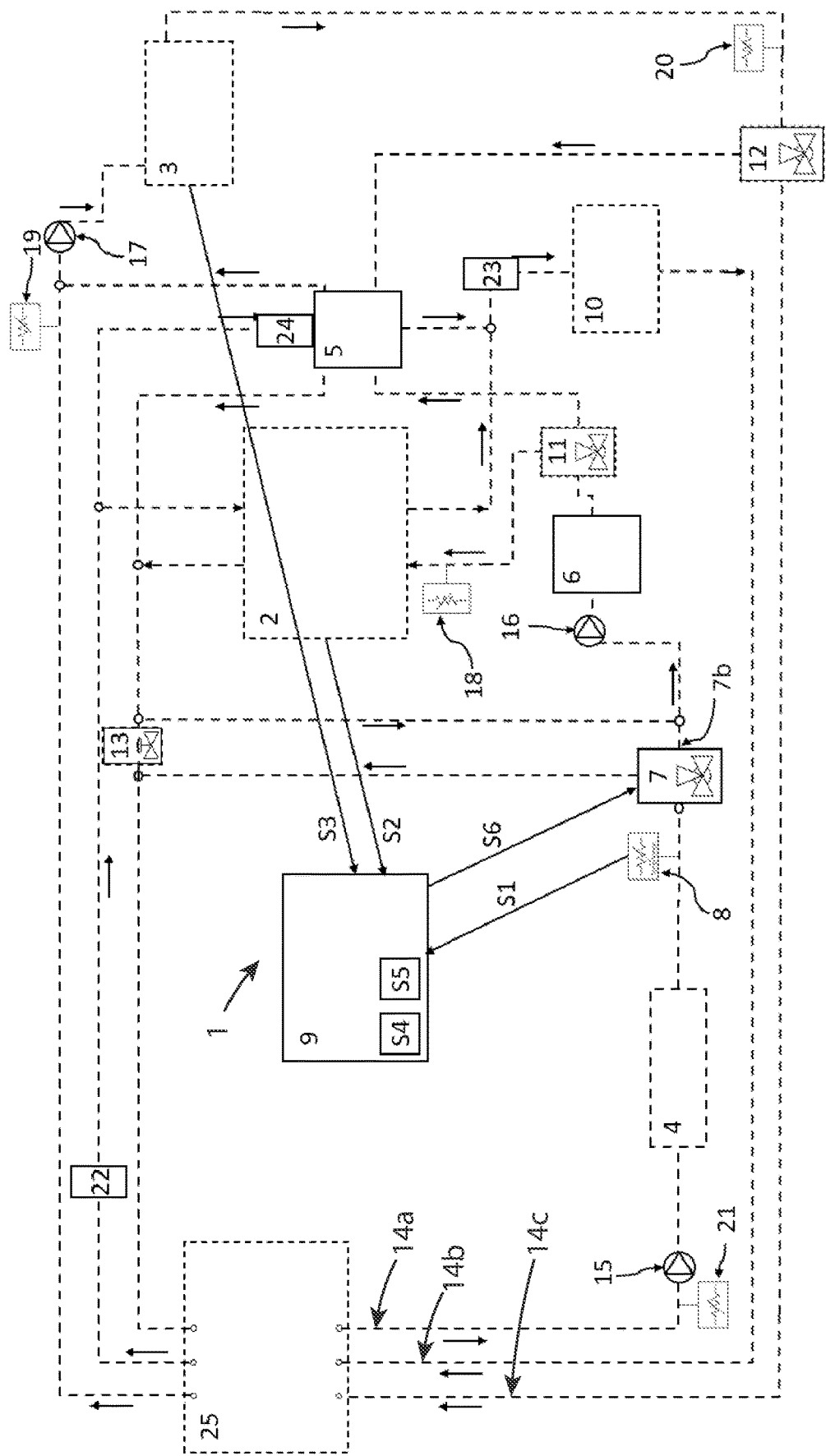
FIG. 8 shows a schematic diagram of an example thermal management system with examples of added temperature sensors, pumps, pressure sensors and a thermal expansion valve.

FIG. 8 shows a schematic diagram of an example thermal management system 1 with examples of added temperature sensors 18, 19, 20, 21, pumps 15, 16, 17, pressure sensors 22, 23 and a thermal expansion valve 24. Only the parts described in claim 1 are necessary to achieve the aim of the disclosure. Other parts are optional or arranged outside of the system as has also been explained above.

The pressure sensors 22, 23 are indicative of the temperature if the cooling loops 14 are transporting refrigerant gas. The pressure sensors 22, 23 may be arranged in the vehicle comprising the system 1. The control unit can use input from the pressure sensor to, for example, control the thermal expansion valve 24 and/or the cooling unit 10. When the thermal fluid is a refrigerant gas, it is for example R134a or R1234YF or similar. It should be noted that different parts of the piping may hold different types of thermal fluid, such as a glycol coolant, water or a refrigerant gas. In general, passages that transport thermal fluid for cooling has a refrigerant gas and passages for heating comprises a thermal liquid. However, other solutions are possible.

The thermal expansion valve 24 controls the amount of refrigerant released into the evaporator, which is a part of the heat exchanger and is intended to regulate the superheat of the vapor leaving the evaporator. The thermal expansion valve may also be integrated in the heat exchanger, or a thermal expansion valve may be arranged in the vehicle comprising the system 1. The thermal expansion valve can be pressure controlled or electrical controlled. It can be electrically engaged (normally closed or normally opened) or just pressure engaged.

LIST OF REFERENCES

1. Thermal management system
2. Cabin
3. Energy storage system
4. Vehicle component
5. Heat exchanger
6. Heater
    a. Heater temperature sensor
7. First valve
    a. Inlet
    b. First outlet
    c. Second outlet
8. First temperature sensor
9. Control unit
10. Cooling unit
11. Second valve
    a. Inlet
    b. First outlet
    c. Second outlet
12. Third valve
    a. Inlet
    b. First outlet
    c. Second outlet
13. Fourth valve
    a. Inlet
    b. Outlet
14. Cooling loops for thermal fluid
    a. First cooling loop
    b. Second cooling loop
    c. Third cooling loop
15. First pump
16. Second pump
17. Third pump
18. Fourth temperature sensor
19. Third temperature sensor
20. Second temperature sensor
21. Fifth temperature sensor
22. First pressure sensor
23. Second pressure sensor
24. Thermal expansion valve
25. External passive cooling system

The invention claimed is:

1. A thermal management system (1) for controlling the temperature in a cabin (2) and an energy storage system (3) of an electric vehicle including a vehicle component (4) and a cooling loop (14a) including a thermal fluid for cooling the vehicle component (4), the system (1) comprising:
   one heat exchanger (5) arranged to heat the energy storage system (3),
   one heater (6) arranged to heat the cabin (2) and to provide heat to the heat exchanger (5), and
   a control unit (9) configured to:
      receive (S2) data associated with a measured temperature in the cabin (2),
      receive (S3) data associated with a measured temperature in the energy storage system (3),
      determine (S4) if any of the cabin (2) or the energy storage system (3) needs to be heated, based on the received data, and
   a first valve (7) disposed in the cooling loop (14a) and having an inlet (7a) arranged to receive the thermal fluid that has been used for cooling the vehicle component (4), and an outlet (7b) in fluid communication with the heater (6), characterized in that the system (1) comprises:
      a temperature sensor (8) arranged to measure the temperature of the thermal fluid entering the inlet (7a) of the first valve, wherein the temperature sensor (8) is arranged in the first valve (7) or in a passage before the thermal fluid enters the first valve (7),
      a second valve (11) having an inlet (11a) arranged to receive the thermal fluid from the heater (6), a first outlet (11b) in fluid communication with the cabin (2), and a second outlet (11c) in fluid communication with the heat exchanger (5), and
   the control unit (9) is configured to:
      receive (S1) the measured temperature of the thermal fluid from the temperature sensor (8),
      determine (S5) if there is excess heat in the thermal fluid entering the inlet (7a) of the first valve based on the measured temperature from the temperature sensor (8),
      control (S6) the outlet (7b) of the first valve (7) so that the thermal fluid is provided to the heater (6) when there is excess heat in the thermal fluid and any of the energy storage system (3) and the cabin (2) needs to be heated, and
      control (S7) the second valve (11) so that the thermal fluid from the heater (6) is distributed to the cabin (2) and/or to the heat exchanger (5) based on the need of heating of the cabin and the energy storage system.

2. The thermal management system (1) according to claim 1, wherein the control unit (9) is configured to control the second valve (11) so that the thermal fluid from the heater (6) is distributed to the cabin (2) and/or to the energy storage system (3) based on information on whether heating of any of the cabin and the energy storage system is to be prioritized.

3. The thermal management system (1) according to claim 1, wherein the second valve (11) is a proportional valve configured so that the first and second outlets (11a, 11b) can be partially opened at the same time and the thermal fluid from the heater (6) can be distributed in varying degrees to the cabin (2) and the heat exchanger (5).

4. The thermal management system (1) according to claim 1, wherein the cooling loop (14a) passes through an external passive cooling system (25), and the control unit (9) is arranged to circulate the thermal fluid back to the passive cooling system (25) when there is no excess heat in the thermal fluid, or if none of the energy storage system (3) and the cabin (2) needs to be heated.

5. The thermal management system (1) according to claim 4, wherein the first valve (7) has second outlet (7c) in fluid communication with the external passive cooling system (25), and the control unit (9) is arranged to control the second outlet (7c) of the first valve (7) so that the thermal fluid is circulated back to the passive cooling system (25) when there is no excess heat in the thermal fluid, or if none of the energy storage system (3) and the cabin (2) needs to be heated.

6. The thermal management system (1) according to claim 1, wherein the control unit (9) is arranged to:
   determine the actual need of heating of the cabin (2) and the actual need of heating of the energy storage system (3) based on the received data,
   control the degree of opening of the first outlet (11b) of the second valve in dependence on the determined actual need of heating of the cabin, and
   control the degree of opening of the second outlet (11c) of the second valve in dependence on the determined actual need of heating of the energy storage system (3).

7. The thermal management system (1) according to any of the previous claims, comprising a heater temperature sensor (6a) arranged to measure the temperature of the thermal fluid entering the heater (6), and the control unit (9) is arranged to receive (S5a) the measured temperature from the heater temperature sensor (6a) and to determine (S5) if there is excess heat in the thermal fluid based on the received measured temperature of the thermal fluid from the first temperature sensor (8) and the measured temperature from the heater temperature sensor (6a).

8. The thermal management system (1) according to claim 7, wherein the heater temperature sensor is disposed inside the heater or in a passage before the thermal fluid enters the heater.

9. The thermal management system (1) according to claim 7 or 8, wherein the control unit (9) is arranged to determine (S5) if the measured temperature from the first temperature sensor (8) is warmer than the measured temperature from the heater temperature sensor (6a), and to control (S6) the opening and closing of the outlet (7b) of the first valve (7) so that the thermal fluid entering the inlet (7a) of the first valve (7) is provided to the heater (6) when any of the energy storage system (3) and the cabin (2) is to be heated and the measured temperature of the thermal fluid from the first temperature sensor (8) is warmer than the measured temperature from the heater temperature sensor (6a).

10. The thermal management system (1) according to claim 1, comprising a third valve (12) arranged with an inlet (12a) from the energy storage system (3), a first outlet (12b) to the heat exchanger (5) and a second outlet (12c) to an external passive cooling system (25), and wherein the control unit (9) is arranged to:
    control (S9) the opening and closing of the first outlet (12b) and second outlet (12c) of the third valve (12) so that a third thermal fluid which is used to heat or cool the energy storage system (3) is directed either to the heat exchanger (5) or to the external passive cooling system (25).

11. The thermal management system (1) according to claim 10, comprising a second temperature sensor (20), arranged to measure the temperature of the third thermal fluid entering the third valve (12), and wherein the control unit (9) is arranged to:
    receive (S9a) the measured temperature of the third thermal fluid from the second temperature sensor (20),
    control (S9b) the opening and closing of the first outlet (12b) and the second outlet (12c) of the third valve (12) based on the received temperature.

12. The thermal management system (1) according to claim 1, comprising one or more pumps (15, 16, 17) and wherein the control unit (9) is arranged to:
    control (S12) the speed of the one or more pumps (15, 16, 17) based on the received data and on the received measured temperature.

13. The thermal management system (1) according to claim 1, wherein the heat exchanger (5) is a chiller.

14. The thermal management system (1) according to claim 5, wherein the thermal management system comprises a fourth valve (13), and the control unit (9) is arranged to:
    control the opening and closing of the fourth valve (13) so that it is opened when the first outlet (7b) of the first valve is opened and closed when the first outlet (7b) of the first valve is closed, and
    control the opening and closing of the second outlet (7c) of the first valve so that it is opened when the first outlet (7b) of the first valve is closed and opened when the first outlet (7b) of the first valve is closed.

15. An electric vehicle comprising a cabin (2), an energy storage system (3), a vehicle component (4), and a cooling loop (14a) including a thermal fluid for cooling the vehicle component (4)a, and the thermal management system (1) according to claim 1.

* * * * *